Patented Jan. 23, 1945

2,367,712

UNITED STATES PATENT OFFICE 2,367,712

SYNTHETIC WAXES AND WAX COMPOSITIONS

Theodore F. Bradley, Stamford, Conn., assignor to American Cyanamid Company, New York, N. Y., a corporation of Maine No Drawing. Application April 2, 1943,
Serial No. 481,597

3 Claims. (Cl. 106—270)

This invention relates to improvements in synthetic wax compositions and is more particularly concerned with the production of synthetic waxes possessed of high melting points and other physical characteristics which enable their use as substitutes for imported, natural waxes such as carnauba wax.

A number of organic compounds are known to react to form wax-like products. These include various dialkyl and alkyl-aryl ketones, halogenated naphthalenes, polyethylene glycols, polyamides, etc. Despite the ease with which such waxes have been synthesized, it is noteworthy that their inherent physical characteristics have not in general permitted them to displace carnauba wax. It has been particularly difficult to produce synthetic waxes possessed of high melting points and even more so to combine this characteristic with hardness, solubility and polishing characteristics of the required nature and degree.

I have found that hard waxes, melting at even higher temperatures than carnauba wax and possessing many other desirable characteristics, can be obtained by reacting omega hydroxy decanoic acid with octadecyl and/or hexadecyl amines. The resulting products are hydroxy amides which are hard waxes at normal temperatures and these waxes may be used for a variety of industrial purposes.

Omega hydroxy decanoic acid has a terminal, primary hydroxyl group which enables this acid to undergo self-esterification upon heating with formation of high molecular weight, resinous esters whereas other types of hydroxy acids form, upon heating, low molecular weight lactides or other estolides which are usually liquid or soft solids of low melting point. The aforesaid and other desirable characteristics of omega hydroxy decanoic acid permit this acid to be used for the production of hard, high-melting grades of waxes by reaction of the acid or of its self-esters with the solid, waxy, fatty amines.

Since the omega hydroxy decanoic acid is self-esterifying, the ratio of acid to the amine may be varied within wide limits below that amount which is required to combine with and to neutralize the free carboxyl groups of the hydroxy acid or acid-ester employed in the reaction mixture. In most cases I prefer to employ the full combining equivalent of fatty amine in order to obtain an hydroxy-amide of negligible acid value.

The invention is more clearly defined and illustrated by the following examples, by which however no limitations are implied other than as specified in the appended claims. Parts are given by weight.

Example I 38 parts of omega hydroxy decanoic acid and 54 parts of octadecyl-amine were admixed in a suitable vessel and heated at 225°–230° C. during 1¾ hours. During this period carbon dioxide was constantly passed through the reaction mixture to provide agitation and minimize discoloration. After this period of reaction, the contents of the vessel were permitted to cool, yielding a hard wax which melted in a capillary tube at between 105°–110° C.

10 parts of the wax was dissolved at 120° C. in 40 parts of mineral spirits and upon cooling this solution solidified to a soft wax paste. When this was applied to a dull-surfaced linoleum and rubber with a dry rag, a high-polish, glossy finish resulted.

The wax in both solid and paste forms was found to emulsify readily upon agitation with hot water containing a small percentage of an emulsifier such as morpholine oleate or the like.

Example II 87 parts of omega hydroxy decanoic acid and 130 parts of a technical grade of mixed octadecyl and hexadecylamines were reacted in the same manner as described in Example I, but at 220° C.–240° C. during 3 hours, yielding a hard wax which melted at 109° C. This product, when heated above its melting point, was found to be miscible in all proportions with paraffine wax of 50° C. melting point and on cooling, such mixtures set to waxy solids which were appreciably harder and of higher melting point than the paraffine wax which had been used in preparing them. Capillary melting points were determined on a number of the mixtures as follows:

| Parts by weight, wax #2 | Parts by weight paraffine wax | Approximate melting point |
|---|---|---|
| | | °C. |
| 0 | 100 | 50 |
| 10 | 90 | 75 |
| 25 | 75 | 83 |
| 33⅓ | 66⅔ | 88 |
| 50 | 50 | 97 |
| 100 | 0 | 109 |

Small additions of this synthetic wax were observed to increase the hardness as well as the melting point of paraffine wax. This property is useful in improvement of wax coatings for paper and other surfaces.

Example III

A white, technical grade of omega hydroxy decanoic acid was found to possess an acid number of 319.8. When 100 parts of this technical acid was heated at 200°–230° C. for 2 hours, the acid number decreased to 95.4 and the viscosity of the material above its melting point increased. 75 parts of this heated product was reacted with 32½ parts of the mixed octadecyl and hexadecylamines at 200°–230° C. for 1½ hours. The resulting wax was harder than the waxes of Examples I and II yet melted at 83° C. Unlike the preceding examples, this wax was found to be immiscible with melted paraffine wax. Above its melting point it was found to be miscible with kerosene and with cottonseed oil but precipitated therefrom in insoluble form while cooling. This wax is therefore appreciably less hydrocarbon soluble than the waxes of Examples I and II and is best adapted for hot melt application to paper or other surfaces where a hard wax finish is required that will possess both water and oil resistance.

The waxes which have been exemplified herein are capable of being modified in many ways without departure from the scope of this invention. Their residual hydroxyl groups may for example be esterified with stearic, palmitic, abietic, phthalic, sebacic, fumaric and other mono or dicarboxylic acids to lower their melting points or to modify their solubility characteristics.

In place of the mono octadecyl and hexadecylamines I may employ heptadecylamine and other wax-like amines of both mono and dialkyl configurations. Other suitable changes may be made in carrying out the invention without departing from the scope thereof as defined in the claims.

I claim:

1. A synthetic wax comprising an hydroxyamide formed by the reaction of omega-hydroxydecanoic acid and an amine selected from the group consisting of octadecylamine, heptadecylamine and hexadecylamine.

2. A synthetic wax comprising a mixed ester and hydroxy-amide formed by the reaction of a self-ester of omega-hydroxydecanoic acid and an amine of the group consisting of octadecylamine, heptadecylamine and hexadecylamine.

3. A homogeneous wax composition comprising at least 50% by weight of paraffin wax, and a synthetic wax formed by the reaction of omega-hydroxydecanoic acid and an amine selected from the group consisting of octadecylamine, heptadecylamine and hexadecylamine, said composition having a melting point substantially above that of the paraffin wax.

THEODORE F. BRADLEY.